US012255291B2

United States Patent
Das et al.

(10) Patent No.: US 12,255,291 B2
(45) Date of Patent: *Mar. 18, 2025

(54) HIERACHICAL STRUCTURE OF TRANSITION METAL CYANIDE COORDINATION COMPOUNDS

(71) Applicant: Natron Energy, Inc., Santa Clara, CA (US)

(72) Inventors: Dyuman Lionnel Das, San Jose, CA (US); Colin Deane Wessells, Menlo Park, CA (US); Daniel Friebel, San Carlos, CA (US); Ronald James Mosso, Fremont, CA (US); Keith Michael Wampler, Santa Monica, CA (US)

(73) Assignee: Natron Energy, Inc., Santa Clara, CA (US)

( * ) Notice: Subject to any disclaimer, the term of this patent is extended or adjusted under 35 U.S.C. 154(b) by 308 days.

This patent is subject to a terminal disclaimer.

(21) Appl. No.: 18/051,765

(22) Filed: Nov. 1, 2022

(65) Prior Publication Data

US 2023/0318047 A1 Oct. 5, 2023

Related U.S. Application Data

(62) Division of application No. 17/711,623, filed on Apr. 1, 2022, now Pat. No. 11,522,229.

(51) Int. Cl.
*H01M 10/24* (2006.01)
*H01M 4/13* (2010.01)
(Continued)

(52) U.S. Cl.
CPC ............. *H01M 10/24* (2013.01); *H01M 4/13* (2013.01); *H01M 4/625* (2013.01); *H01M 4/667* (2013.01);
(Continued)

(58) Field of Classification Search
CPC ...... H01M 10/24; H01M 10/054; H01M 4/13; H01M 4/625; H01M 4/667; H01M 4/0404; H01M 4/139; H01M 4/583; H01M 4/622

See application file for complete search history.

(56) References Cited

U.S. PATENT DOCUMENTS 9,608,268 B2 3/2017 Lu et al.
10,529,987 B1 * 1/2020 Keshavarz .............. H01M 4/58
(Continued)

FOREIGN PATENT DOCUMENTS

CA 2916900 C * 12/2018 ........ H01M 10/0525

OTHER PUBLICATIONS

Li et al., Li-ion and Na-ion insertion into size-controlled nickel hexacynoferrate nanoparticles, RSC Adv., 2014, 4, 24955-24961.
(Continued)

*Primary Examiner* — Jimmy Vo
(74) *Attorney, Agent, or Firm* — Patent Law Offices Michael E. Woods; Michael E. Woods

(57) ABSTRACT

A system and method for implementing and manufacturing a hierarchy system for use with a TMCCC-containing electrically-conductive structure (e.g., an electrode) as well as methods for use and manufacturing of such structures and electrochemical cells including these devices. Structures and methods include a coordination complex having $L_xM_yN_zTi_{a1}V_{a2}Cr_{a3}Mn_{a4}Fe_{a5}Co_{a6}Ni_{a7}Cu_{a8}Zn_{a9}Ca_{a10}Mg_{a11}[R(CN)_6]_b(H_2O)_c$. The method includes binding electrochemically active material to produce a hierarchical structure, the hierarchical structure having a plurality of primary crystallites having a size D1, the plurality of these primary crystallites agglomerated into a set of agglomerates each agglomerate having a size D2>D1.

10 Claims, 12 Drawing Sheets

(51) Int. Cl.
  *H01M 4/62* (2006.01)
  *H01M 4/66* (2006.01)
  *H01M 10/054* (2010.01)
  *H01M 4/04* (2006.01)
  *H01M 4/139* (2010.01)
  *H01M 4/583* (2010.01)

(52) U.S. Cl.
  CPC ........ *H01M 10/054* (2013.01); *H01M 4/0404* (2013.01); *H01M 4/139* (2013.01); *H01M 4/583* (2013.01); *H01M 4/622* (2013.01)

(56) References Cited

U.S. PATENT DOCUMENTS

| | | | |
|---|---|---|---|
| 11,522,229 B1 | 12/2022 | Das et al. | |
| 11,695,163 B1 | 7/2023 | Das et al. | |
| 11,769,912 B1 | 9/2023 | Das et al. | |
| 2004/0091773 A1* | 5/2004 | Boczer | H01M 10/0569 429/224 |
| 2014/0308544 A1* | 10/2014 | Wessells | H01M 4/485 429/188 |
| 2016/0380307 A1* | 12/2016 | Akita | H01M 10/0525 429/144 |

OTHER PUBLICATIONS

You, et al, "high-quality prussian blue crystals as superior cathode materials for room-temperature sodium-ion batteries" enery environ sci, Feb. 28, 2014, doi: 10.1039/c3ee44004d.

Shrivastava, et al., "Electron Conduction in Nanoparticle Agglomerates Limits Apparent Na+ Diffusion in Prussian Blue Analogue orous Electrodes", ournal of The Electrochemical Society, 165 (9) A1777-A1787 (2018).

He, et al., "Crystallite Size Control of Prussian White Analogues for Nonaqueous Potassium-Ion Batteries", DOI: 10.1021/acsenergylett. 7b00179, ACS Energy Lett. 2017, 2, 1122-1127.

Yang, et al., "Structure optimization of Prussian blue analogue cathode materials for advanced sodium ion batteries", Chem. Commun. 2014, DOI: 10.1039/c4cc05830e.

U.S. Appl. No. 18/372,450, filed Sep. 25, 2023, Dyuman Lionnel Das et al.

U.S. Appl. No. 17/711,623, filed Apr. 1, 2022, Dyuman Lionnel Das et al.

U.S. Appl. No. 18/061,871, filed Dec. 5, 2022, Dyuman Lionnel Das et al.

U.S. Appl. No. 18/196,318, filed May 11, 2023, Dyuman Lionnel Das et al.

* cited by examiner

HIERACHICAL STRUCTURE OF TRANSITION METAL CYANIDE COORDINATION COMPOUNDS

CROSS REFERENCE TO RELATED APPLICATIONS

This Application is a Division of application Ser. No. 17/711,623 filed on Apr. 1, 2022, the contents of which are hereby expressly incorporated by reference thereto in its entirety for all purposes.

FIELD OF THE INVENTION

The present invention relates generally to electrochemical cells including an electrochemically active coordination compound in one or more conductive structures in such cells, and more specifically, but not exclusively, to an improvement in electrochemical cells having a new class of transition metal cyanide coordination compounds (TMCCC) for use, for example, in TMCCC-containing conductive structures, for example electrodes, as well as electrochemical cells made using such TMCCC-containing conductive structures.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Electrochemical cells play a critical role in energy storage in a variety of applications including but not limited to electric vehicles, grid storage applications, data center infrastructure, and consumer electronics. An important property of an electrochemical cell includes an ability to accumulate, hold, and release charge as needed. The application of an electrochemical cell is influenced by discharge rates at which the cell can be emptied without significant capacity loss and any change in operational characteristics of the cell by the accumulation, storage, and release of the charge.

FIG. 1 illustrates a Nyquist plot highlighting metrics used in quantification of an electrochemical cell. The Nyquist plot of FIG. 1 is generated by electrochemical impedance spectroscopy (EIS) of a cell and provides an insight into the inner workings of the plotted cell. The plot includes a semicircle, and the value of the semicircle's intercept with the real axis (A) is known as the Equivalent Series Resistance (ESR) and is a measure of the internal resistance of the battery. The width of the semicircle (B) is indicative of the charge transfer resistance of the electrochemical cell. A larger semicircle width is detrimental to the performance of an electrochemical cell in that the power output of the cell is heavily compromised. The 45° slope (C) is indicative of the ionic diffusion through the electrochemical cell.

The Li-ion battery has become a popular battery architecture for mobile applications such as electric vehicles and portable electronic devices in part because of the ability of a set of Li-ion batteries to provide high energy density without sacrificing performance and longevity. However, the increasing cost of Lithium as well as other essential components of the Li-ion battery have spurred advances into alternative, cheaper options for applications in which high energy density is not required.

Sodium is much more abundant than Lithium so in an application and to an extent a sodium-ion battery provides competitive performance as compared to the Li-ion battery, the sodium-ion architecture may serve as a suitable alternative to Lithium given the proper surrounding framework. Transmission metal cyanide coordination compounds (TMCCC) may be synthesized to create an open framework allowing for high mobility of Sodium ions through the lattice.

Compositions of TMCCC have been described for use in cathode electrodes but little attention is given to the morphology of the material. For instance, REF[1] describes the use of a cathode including a TMCCC having the form of $A_xM1M2(CN)_6$, where the A cations may be Na or K, x=0-2, and each of M1 and M2 is a metal cation such as Ti, V, Cr, Mn, Fe, Co, Ni, Cu, Zn, Ca, Mg but does not specify the physical properties of the material.

A lack of enforceable physical criteria, opens up the possibility of creating TMCCC materials that meet all the desired/required compositional criteria but still underperforms when actually used in an electrochemical cell.

A first key property is the specific surface area of the TMCCC, as measured by Nitrogen adsorption and calculated with the Brunauer-Emmett-Teller (BET) theory, which primarily correlates with the primary particles size of the TMCCC. As a secondary effect the BET is decreased with additional aggregation and provides insights into the pores within the material as well as the spacing between aggregates. FIG. 2 illustrates the specific surface area of TMCCC cited in examples III, IV, VII, and VIII described herein and the semicircle width of electrochemical cells made with those TMCCC. As may be understood from a review of FIG. 2, when the specific surface area of a TMCCC drops beneath a certain point, the semicircle width of an electrochemical cell made with that TMCCC increases significantly. One popular theory is that a low specific surface area could correspond to inner pores closing off and being inaccessible to ion transfer, thus significantly increasing the charge transfer resistance. The observation of a significant increase in the semicircle width as a result of a lower TMCCC specific surface area, highlights an opportunity for a boundary to be imposed on the specific surface area of a TMCCC to ensure well performing electrochemical cells.

The tap density of a TMCCC helps to provide insights into a compactness of aggregates and a void space between them. FIG. 3 illustrates a tap density of the TMCCC cited in the examples described herein, including examples III, IV, VI, and VII and the semicircle width of electrochemical cells made with those TMCCC. As may be understood from a review of FIG. 3, when the tap density of a TMCCC increases above a certain point, a semicircle width of an electrochemical cell made with that TMCCC increases significantly. Such an increase in the semicircle width as a result of a lower TMCCC surface area, highlights an opportunity for a boundary to be imposed on the tap density to ensure well performing electrochemical cells.

A median size of the agglomerates, as measured by a particle size analyzer (PSA) and recorded as the D50, is also preferably considered and carefully chosen. TMCCC with agglomerates D50 outside of the desired range may lead to electrodes with mechanical defects such as cracking or non-uniform coating. Similarly, the 10th percentile value (D10) and the 90th percentile value (D90) must also be limited to a desirably range.

Controlling these physical TMCCC characteristics, including one or more of tap density, surface area, and D10, D50, and/or D90, may be important to understanding whether the ensuing electrochemical cell may perform adequately and maintain its specific capacity even when discharged at a higher rate than its nominal rate.

There may be benefits to an appropriately implemented hierarchy system for use with a TMCCC-containing electrically-conductive structure (e.g., an electrode) as well as methods for use and manufacturing of such structures and electrochemical cells including these devices.

BRIEF SUMMARY OF THE INVENTION

Disclosed is a system and method for implementing and manufacturing a hierarchy system for use with a TMCCC-containing electrically-conductive structure (e.g., an electrode) as well as methods for use and manufacturing of such structures and electrochemical cells including these devices. The following summary of the invention is provided to facilitate an understanding of some of the technical features related to electrodes including TMCCC materials (and methods for their manufacture), and is not intended to be a full description of the present invention. A full appreciation of the various aspects of the invention can be gained by taking the entire specification, claims, drawings, and abstract as a whole. The present invention is applicable to other electrochemically active compounds in addition to TMCCC materials, for example other coordination materials, and to other electrically-conductive structures that include a coordination material.

An embodiment may include a new class of TMCCC having a coordination complex, having a composition, as synthesized, of $L_xM_yN_zTi_{a1}V_{a2}Cr_{a3}Mn_{a4}Fe_{a5}Co_{a6}Ni_{a7}Cu_{a8}Zn_{a9}Ca_{a10}Mg_{a11}[R(CN)_6]_b$ $(H_2O)_c$; and a plurality of particles of the composition; and wherein the plurality of particles include a hierarchical structure, and wherein the hierarchical structure includes a plurality of primary crystallites having a size D1, and in which the plurality of primary crystallites are agglomerated into a set of agglomerates each agglomerate having a size D2>D1. One or more of the following may apply: (a) wherein each of L, M and N represents an alkaline metal; (b) wherein $0 \le x \le 2$; (c) wherein $0 \le y \le x$; (d) wherein $0 \le z \le x$; (e) wherein $0 < b \le 1$; (f) wherein $0 < c$; (g) wherein for each element of the set {a1, a2, a3, a4, a5, a6, a7, a8, a9, a10, a11}, $0 \le \{a1, a2, a3, a4, a5, a6, a7, a8, a9, a10, a11\} \le 1$; and (h) wherein at least one of {a1, a2, a3, a4, a5, a6, a7, a8, a9, a10, a11} is >0.

An embodiment for an electrode may include one or more conductive carbons, one or more polymer binders, a current collector, and one or more TMCCC; wherein: (a) the conductive carbons include nanoparticulate carbons; (b) the current collector includes a metal foil; (c) the metal foil includes a surface coating including carbon; (d) the polymer binder includes functionalized SEBS binders; and (e) the TMCCC may include a composition as specified herein.

An embodiment for an electrochemical cell may include a cell stack having a liquid electrolyte, an anode electrode, a separator, and a cathode electrode, the electrodes electrochemically communicated with the liquid electrolyte, wherein: (a) the cell stack may contain additional anode, cathode or reference electrodes; (b) the liquid electrolyte includes a polar organic solvent combined with an alkali metal salt; (c) the separator includes polymer membranes; (d) the membrane may have a surface coating including nanoparticulate alumina and boehmite; (e) the anode electrode includes a TMCCC; (f) the anode electrode includes a conductive carbon; and (g) the cathode electrode includes a TMCCC having a composition as described herein.

An embodiment of the present invention may alternatively include a coordination complex represented by $M_aN_bP_xQ_y[R(CN)_6]_z$, and may further include a plurality of particles, wherein said particles include a hierarchical structure, and wherein said hierarchical structure includes a plurality of primary crystallites having a size D1, and in which said primary crystallites are agglomerated into larger agglomerates having a size D2. Further, wherein one or more of the following apply: (a) wherein each of M and N represents an alkaline metal; (b) wherein each of P, Q, and R is a metal cation such as Ti, V, Cr, Mn, Fe, Co, Ni, Cu, Zn, Ca, Mg; (c) wherein $0 < a \le 2$; (d) wherein $0 \le b \le a$; wherein $0 \le x \le 1$; (e) wherein $0 \le y \le 1$; (f) wherein at least one of x and y is greater than zero; (g) wherein $0 < z \le 1$; (h) wherein D1<1 µm; (i) wherein D2 includes a particle size distribution, in which the 50th percentile size is greater than 6 µm; (j) wherein the 10th percentile size of D2 is greater than 1.5 µm; (k) wherein the 90th percentile size of D2 is greater than 7.5 µm; (l) wherein the TMCCC material includes a specific surface area>2 m$^2$ per gram; (m) wherein the TMCCC material includes a tap density<0.9 g/cm$^3$.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
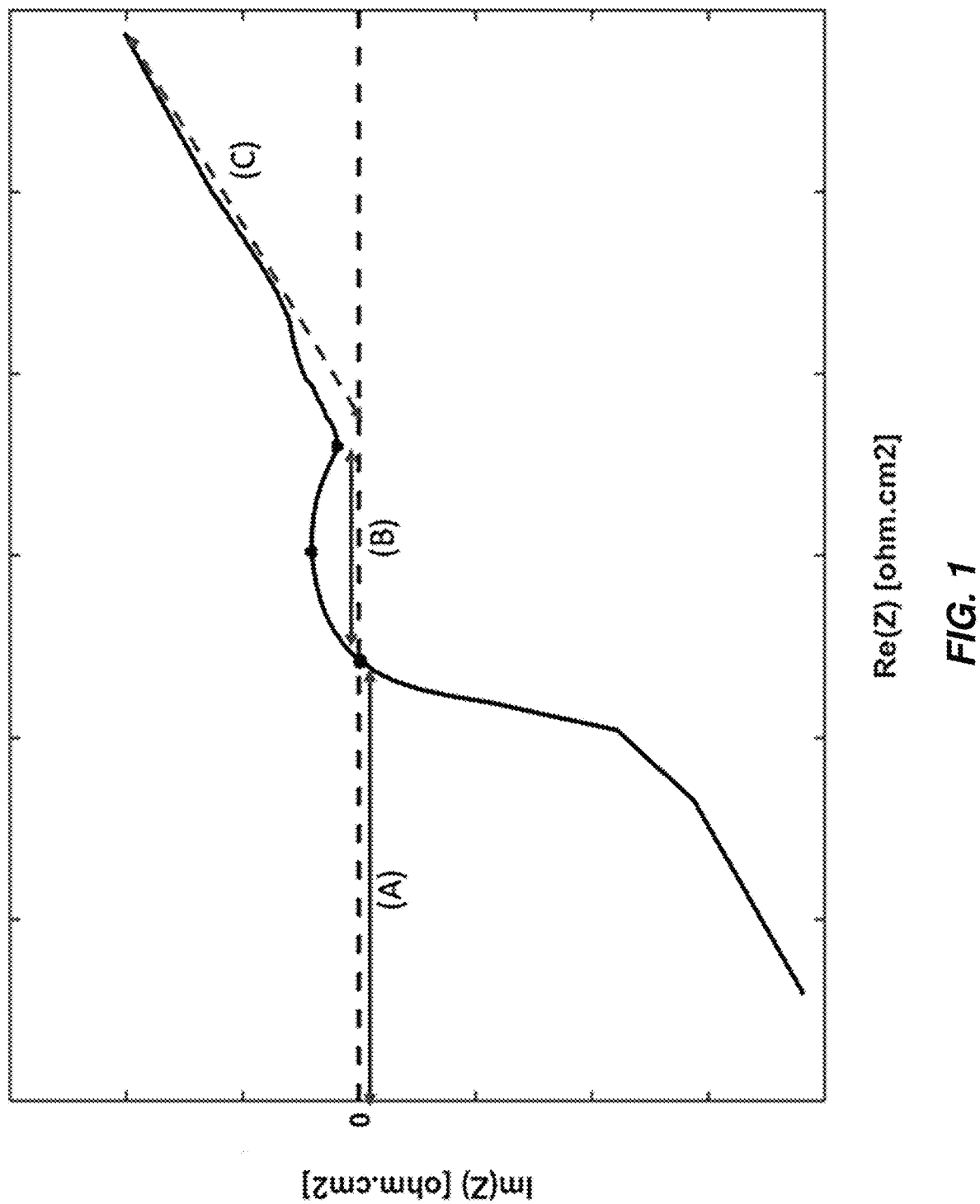
FIG. 1 illustrates a Nyquist plot highlighting metrics used in quantification of a performance of an electrochemical cell.
Figure 2:
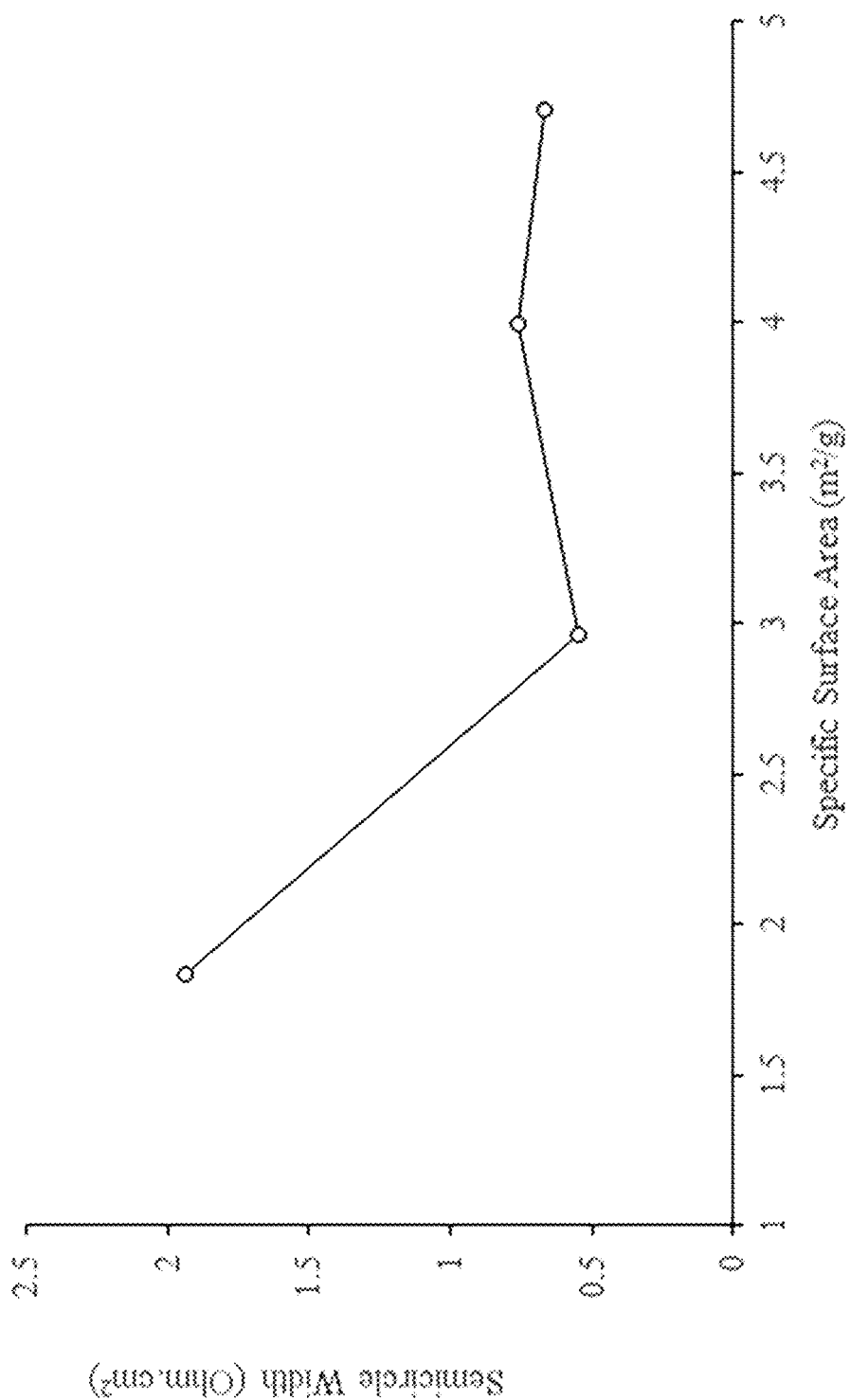
FIG. 2 illustrates a specific surface area of TMCCC cited in examples II, V, VI, and VIII described herein and the semicircle width of electrochemical cells made with those TMCCC.
Figure 3:
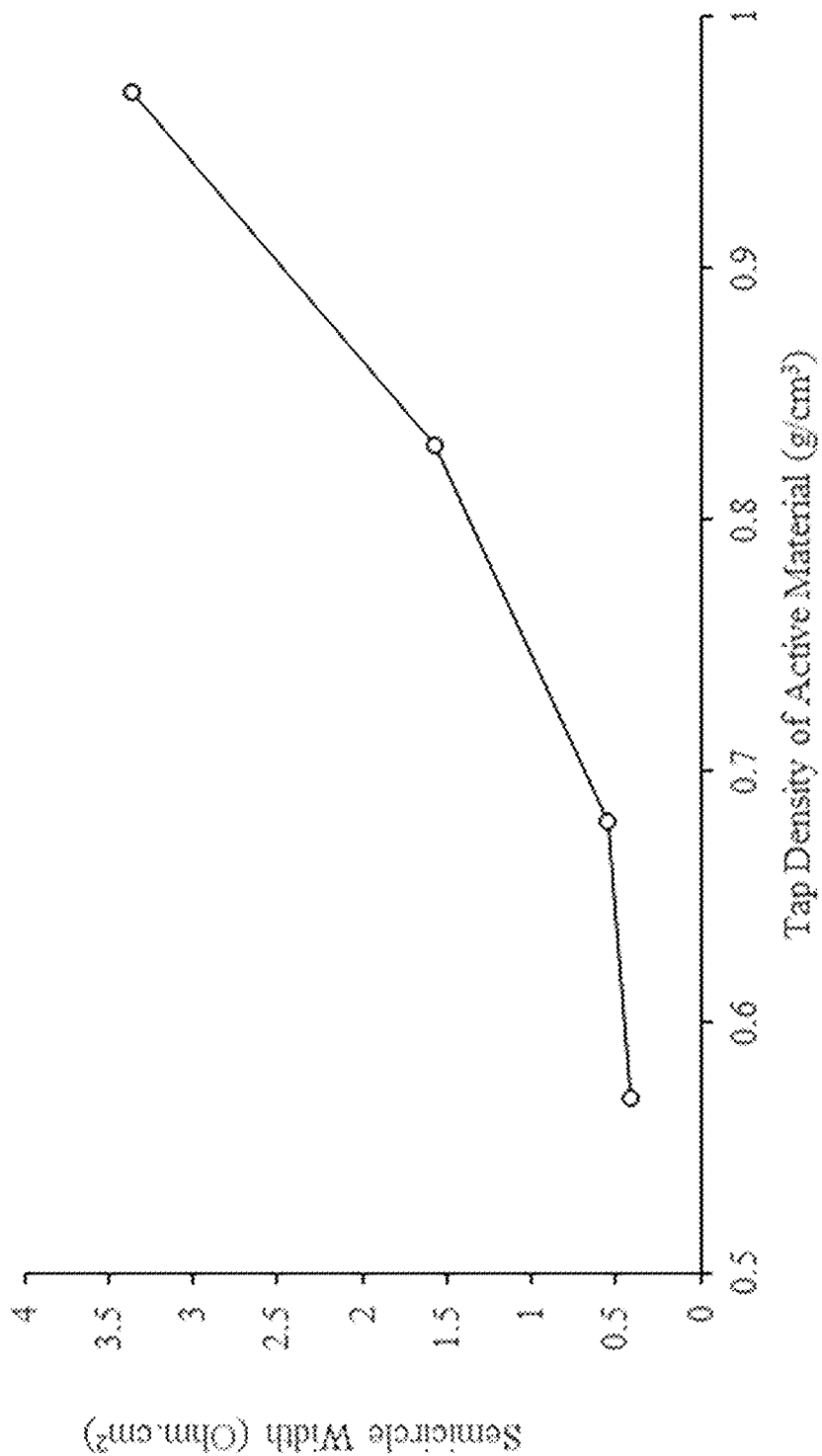
FIG. 3 illustrates a tap density of TMCCC cited in the examples described herein, including examples III, IV, VII, and VIII and the semicircle width of electrochemical cells made with those TMCCC.

Embodiments of the present invention provide a system and method for implementing and manufacturing a hierarchy system for use with a TMCCC-containing electrically-conductive structure (e.g., an electrode) as well as methods for use and manufacturing of such structures and electrochemical cells including these devices. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to certain embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "size" refers to a characteristic dimension of an object. Thus, for example, a size of an object that is spherical can refer to a diameter of the object. In the case of an object that is non-spherical, a size of the non-spherical object can refer to a diameter of a corresponding spherical object, where the corresponding spherical object exhibits or has a particular set of derivable or measurable properties that are substantially the same as those of the non-spherical object. Thus, for example, a size of a non-spherical object can refer to a diameter of a corresponding spherical object that exhibits light scattering or other properties that are substantially the same as those of the non-spherical object. Alternatively, or in conjunction, a size of a non-spherical object can refer to an average of various orthogonal dimensions of the object. Thus, for example, a size of an object that is a spheroidal can refer to an average of a major axis and a minor axis of the object. When referring to a set of objects as having a particular size, it is contemplated that the objects can have a distribution of sizes around the particular size. Thus, as used herein, a size of a set of objects can refer to a typical size of a distribution of sizes, such as an average size, a median size, or a peak size.

The TMCCC materials described herein may be used in an electrode in an electrochemical cell. The electrochemical cell may also include additional electrodes, an electrolyte and a separator membrane. Any additional electrodes may include a second TMCCC material, a carbon material such as activated charcoal, hard carbon, or graphite, or another material. The electrolyte may include one or more organic solvents such as acetonitrile, cyclic or linear carbonates, or other organic solvents, or water. The separator membrane may contain polymers and may have surface coating included but not limited to nano-alumina, and boehmite.

As used herein, the term "electrode" in the context of an electrochemical cell may have different meanings and sometimes encompass different sets of components of the electrochemical cell in different contexts and different audiences. For example, the electrode, as comprised by the TMCCC, carbon, and binder, as well as the solvents used in the slurry processing to make the electrode, is typically considered to be entirely separate from a current collector. This electrode structure could be deposited on any number of current collectors having different compositions (aluminum, copper, etc.) or mechanical properties (thickness, surface roughness, and the like). One precise definition would be to refer to an "electrode" as comprising two components: both an "active layer" or "electrode composite" including the TMCCC, carbons, and binders, as well as a current collector, which may in turn have subcomponents such as a special surface coating, or special design features such as physical dimensions. The present application has adopted a special term used herein to avoid some imprecision that is present when referring to an electrode of an electrochemical cell. This term is "electrically conductive structure" and includes electrodes as well as other electrochemically-active structures that may be used as an electrode. Some larger structures that encompass an electrode may also be such an "electrically conductive structure" within the meaning of the present application, unless the context would reasonably suggest otherwise to a person having ordinary skill in the art apprised of this disclosure and understanding of the discussion and claims presented herein.

The current disclosure highlights a new class of TMCCC material with a broad range of specific surface area, tap density and median particle size. A set of criteria is disclosed which limit the specific surface area, tap density and median particles size so as to ensure a low semicircle width and the ability to access above 70% of an electrochemical cell's nominal capacity even when discharging at 20 times the nominal discharge rate.

The examples below illustrate an importance of these physical morphology criteria disclosed as part of embodiments of the present invention.

EXAMPLE I

A TMCCC cathode material having a composition of $Na_{1.24}Mn_{0.78}Fe_{0.22}[Fe(CN)_6]_{0.88}(H_2O)_{2.82}$ a tap density of 0.79 g/cm$^3$, a specific surface area of 4.23 m$^2$/g and D10, D50, D90 values of 5.6 um, 8.5 um, 12.9 um respectively, was mixed with an elastomeric adhesive binder and nanoparticulate carbon black in an organic solvent blend to form a slurry. This slurry was deposited onto a carbon coated aluminum foil current collector using a drawdown coater and dried at 60° C. for 35 min to evaporate the solvent. The ensuing coat was calendered (roll pressed) to further increase its density, vacuum dried, and cut into electrodes for use in electrochemical cells. Then, electrochemical cells were assembled by combining a TMCCC electrode, an activated charcoal electrode, a porous membrane separator, and an electrolyte containing a Sodium(I) Bis(trifluoromethanesulfonyl)imide salt and an acetonitrile solvent. Electrochemical testing of this cell was performed, including electrochemical impedance spectroscopy and five constant current charge-discharge cycles at a charging rate of 1 C and a discharge rate of 0.2 C, 1 C, 5 C, 10 C, and 20 C.

Figure 4:
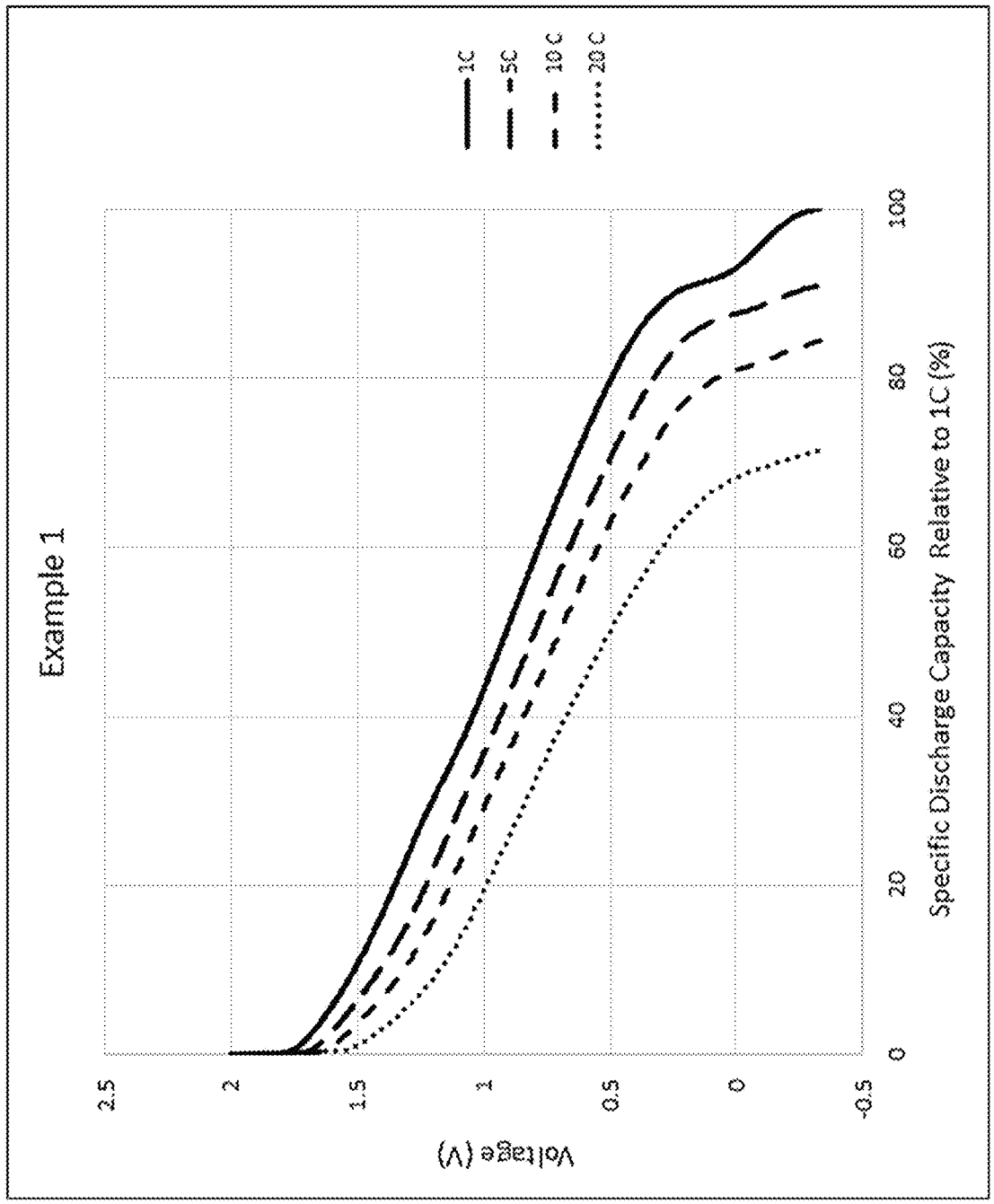
FIG. 4 illustrates a set of discharge curves for the electrochemical cell from example I at 1 C, 5 C, 10 C and 20 C.

FIG. 4 illustrates a set of discharge curves for the electrochemical cell from example I at 1 C, 5 C, 10 C and 20 C. Even at 20 times the nominal discharge rate, the capacity available is above 70% (71.5% of 1 C capacity) of the nominal capacity.

EXAMPLE II

A TMCCC cathode having a composition of $Na_{1.18}Mn_{0.77}Fe_{0.24}[Fe(CN)_6]_{0.86}(H_2O)_{2.44}$ a tap density of 0.68 g/cm$^3$, a specific surface area of 1.83 m$^2$/g and D10, D50, D90 values of 7.7 um, 12.3 um, 18.1 um respectively, was processed into an electrode similarly as described in example I. Electrochemical cells were then made following a similar procedure as in example I. Electrochemical testing of this cell was performed, including electrochemical impedance spectroscopy and five constant current charge-discharge cycles at a charging rate of 1 C and a discharge rate of 0.2 C, 1 C, 5 C, 10 C, and 20 C.

Figure 5:
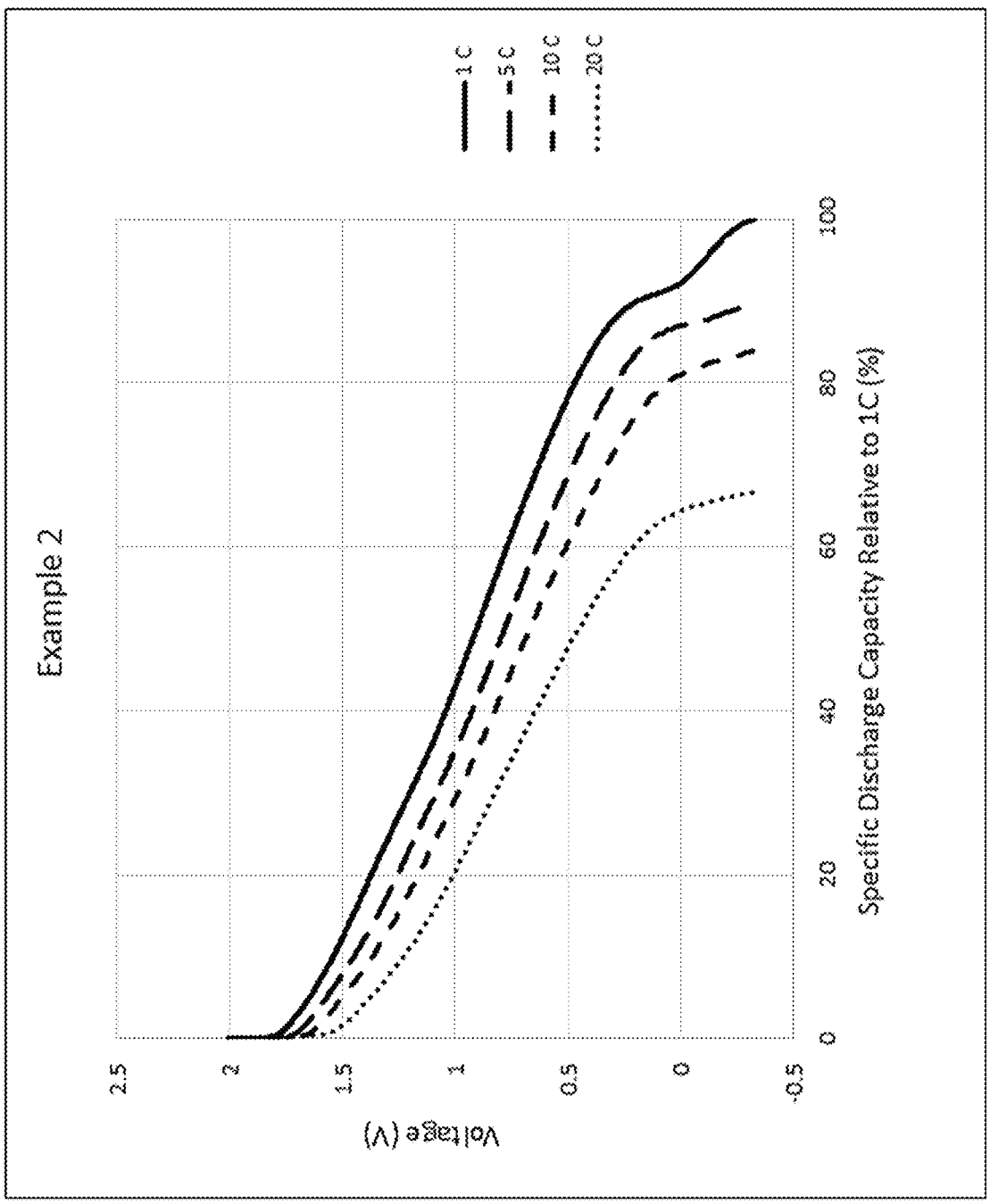
FIG. 5 illustrates a set of discharge curves for the electrochemical cell from example II at 1 C, 5 C, 10 C and 20 C.

FIG. 5 illustrates a set of discharge curves for the electrochemical cell from example II at 1 C, 5 C, 10 C and 20 C. Unlike the cell in example I, the cell in example II only attains 66% of its nominal capacity when it is discharged at 20 times its nominal rate.

EXAMPLE III

A TMCCC cathode material having a composition of $Na_{1.25}Mn_{0.75}Fe_{0.25}[Fe(CN)_6]_{0.89}$, $(H_2O)_{2.95}$ a tap density of 0.97 g/cm$^3$, a specific surface area of 2.22 m$^2$/g and D10, D50, D90 values of 7.3 um, 10.4 um, 14.4 um respectively, was processed into an electrode similarly as described in example I. Electrochemical cells were then made similarly to the same procedure as in example I. Electrochemical testing of this cell was performed, including electrochemical impedance spectroscopy and five constant current charge-discharge cycles at a charging rate of 1 C and a discharge rate of 0.2 C, 1 C, 5 C, 10 C, and 20 C.

Figure 6:
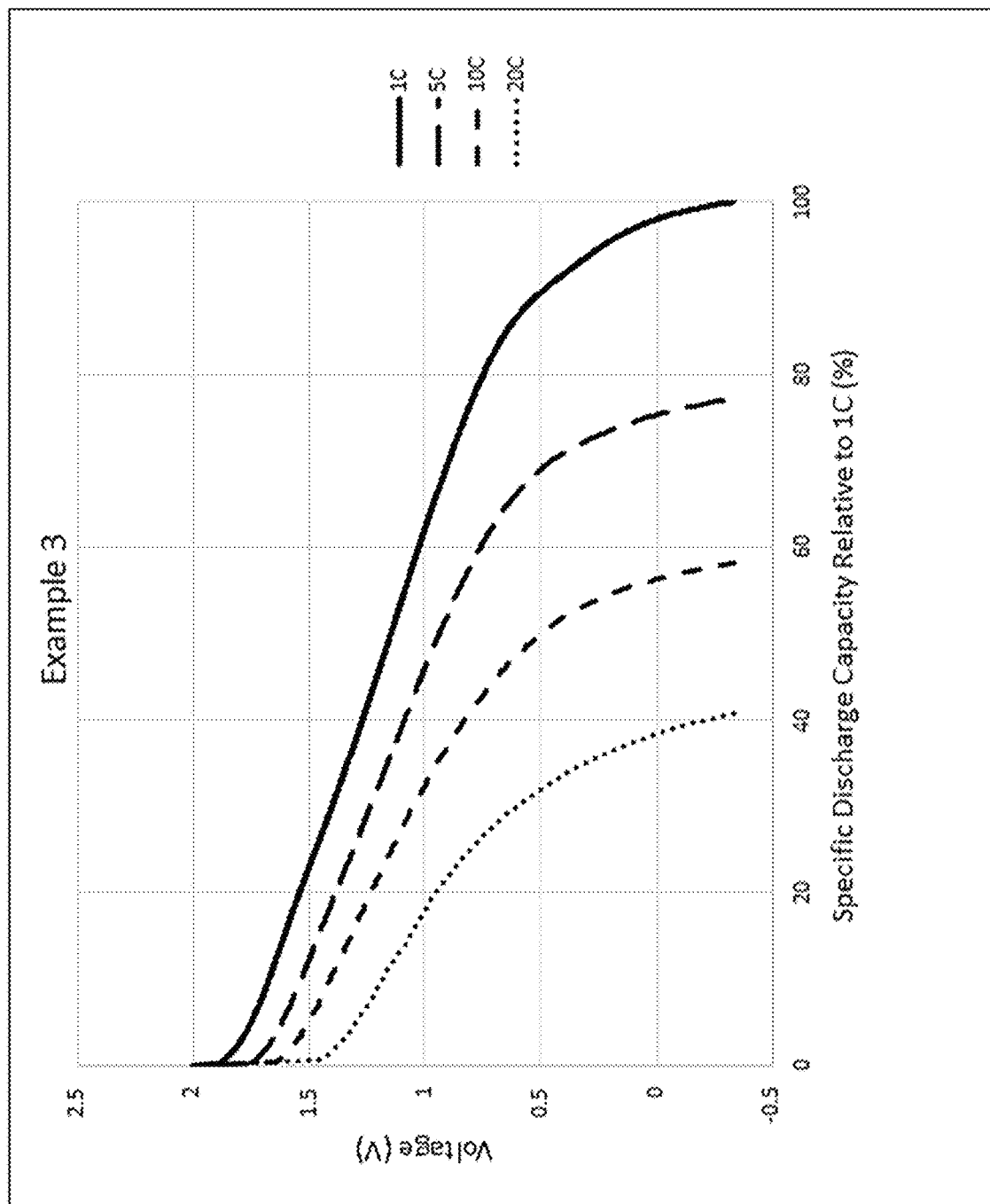
FIG. 6 illustrate a set of discharge curves for the electrochemical cell from example III at 1 C, 5 C, 10 C and 20 C.

FIG. 6 illustrate a set of discharge curves for the electrochemical cell from example III at 1 C, 5 C, 10 C and 20 C. Unlike the cell in example I, the cell in example III only attains 41% of its nominal capacity when it is discharged at 20 times its nominal rate.

EXAMPLE IV

A TMCCC cathode material having a composition of $Na_{1.24}Mn_{0.77}Fe_{0.23}[Fe(CN)_6]_{0.88}(H_2O)_{2.57}$ with a tap density of 0.83 g/cm$^3$, a specific surface area of 4.69 m$^2$/g and D10, D50, D90 values of 5.9 um, 9 um, 13.9 um respectively, was processed into an electrode similarly as described in example I. Electrochemical cells were then made following similar to the procedure as in example I. Electrochemical Impedance Spectroscopy was then run on these cells.

EXAMPLE V

A TMCCC cathode material having a composition of $Na_{1.25}Mn_{0.79}Fe_{0.21}[Fe(CN)_6]_{0.88}(H_2O)_{3.53}$ with a tap density of 0.83 g/cm³, a specific surface area of 4.71 m²/g and D10, D50, D90 values of 5.9 um, 9 um, 13.5 um respectively, was processed into an electrode similarly to the manner as described in example I. Electrochemical cells were then made similarly to the procedure as in example I. Electrochemical Impedance Spectroscopy was then run on these cells.

EXAMPLE VI

A TMCCC cathode material having a composition of $Na_{1.24}Mn_{0.78}Fe_{0.22}[Fe(CN)_6]_{0.88}(H_2O)_{3.63}$ with a tap density of 0.84 g/cm³, a specific surface area of 3.99 m²/g and D10, D50, D90 values of 6.3 um, 9.4 um, 13.4 um respectively, was processed into an electrode similarly to the manner as described in example I. Electrochemical cells were then made similarly to the procedure as in example I. Electrochemical Impedance Spectroscopy was then run on these cells.

EXAMPLE VII

A TMCCC cathode material having a composition of $Na_{1.17}Mn_{0.75}Fe_{0.25}[Fe(CN)_6]_{0.87}(H_2O)_{2.61}$ with a tap density of 0.57 g/cm³, a specific surface area of 4.69 m²/g and D10, D50, D90 values of 6.7 um, 11.5 um, 17.4 um respectively, was processed into an electrode similarly to the manner as described in example I. Electrochemical cells were then made following as similar procedure as in example I. Electrochemical Impedance Spectroscopy was then run on these cells.

EXAMPLE VIII

A TMCCC cathode material having a composition of $Na_{1.15}Mn_{0.75}Fe_{0.25}[Fe(CN)_6]_{0.86}(H_2O)_{2.44}$ with a tap density of 0.68 g/cm³, a specific surface area of 2.96 m²/g and D10, D50, D90 values of 5.6 um, 9 um, 13.5 um respectively, was processed into an electrode similarly to the manner as described in example I. Electrochemical cells were then made following similarly to the procedure as in example I. Electrochemical Impedance Spectroscopy was then run on these cells.

EXAMPLE IX

A TMCCC cathode material having a composition of $Na_{1.22}Mn_{0.77}Fe_{0.23}[Fe(CN)_6]_{0.87}(H_2O)_{2.50}$ with a tap density of 0.66 g/cm³, a specific surface area of 5.47 m²/g and D10, D50, D90 values of 5.7 um, 10.8 um, 17.2 um respectively, was processed into an electrode similarly to the manner as described in example I. Electrochemical cells were then made similarly to the procedure as in example I. Electrochemical Impedance Spectroscopy was then run on these cells.

Table 1 summarizes a set of physical parameters of the TMCCC in these examples as well as a semicircle width of the corresponding electrochemical cells.

TABLE 1

| Example | Tap density [g/cm³] | Specific Surface Area [m²/g] | D10 [um] | D50 [um] | D90 [um] | Semicircle width, normalized to Example I |
|---------|---------------------|------------------------------|----------|----------|----------|-------------------------------------------|
| 1 | 0.79 | 4.23 | 5.6 | 8.5 | 12.9 | 1 |
| 2 | 0.68 | 1.83 | 7.7 | 12.3 | 18.1 | 3.18 |
| 3 | 0.97 | 2.22 | 7.3 | 10.4 | 14.4 | 5.52 |
| 4 | 0.83 | 4.69 | 5.9 | 9 | 13.9 | 2.59 |
| 5 | 0.83 | 4.71 | 5.9 | 9 | 13.5 | 1.09 |
| 6 | 0.84 | 3.99 | 6.3 | 9.4 | 13.4 | 1.25 |
| 7 | 0.57 | 4.69 | 6.7 | 11.5 | 17.4 | 0.69 |
| 8 | 0.68 | 2.96 | 5.6 | 9 | 13.5 | 0.90 |
| 9 | 0.66 | 5.47 | 5.7 | 10.8 | 17.2 | 1.11 |

Additional examples further highlight an importance of controlling the D10, D50, D90 parameters of the TMCCC to improve post-synthesis processing, such as manufacturing a TMCCC that can be processed into an electrochemical cell with improved characteristics.

EXAMPLE X

Figure 7:
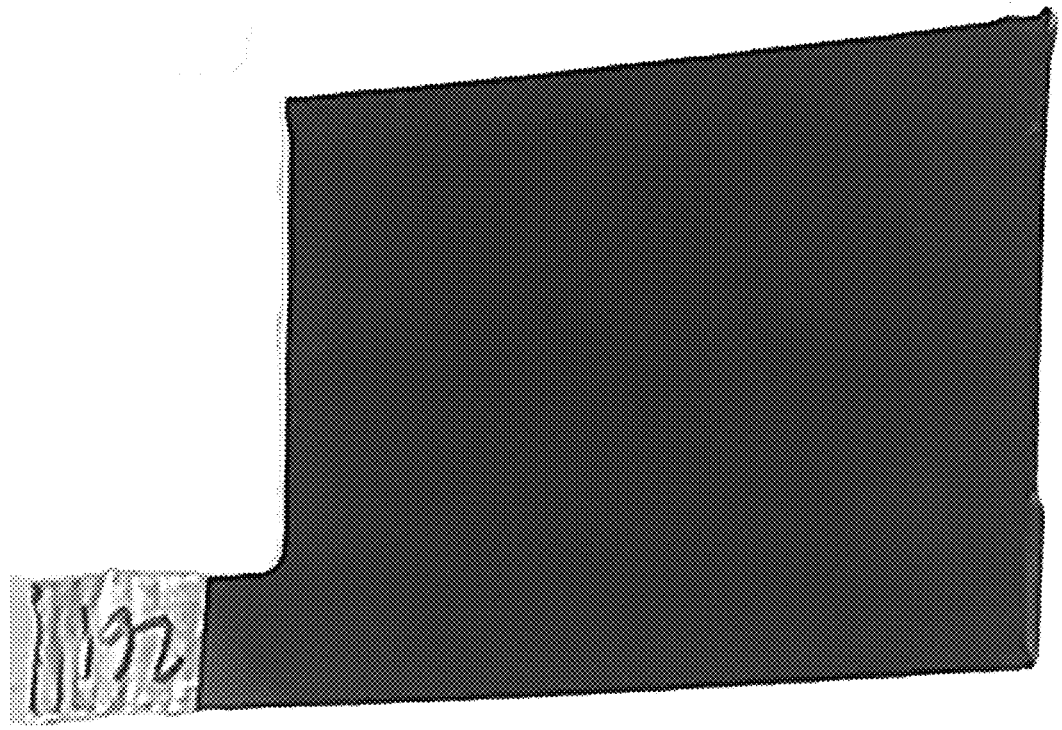
FIG. 7 illustrates a set of ensuing electrodes made with the TMCCC of example X lacking appreciable surface defects.
Figure 7:
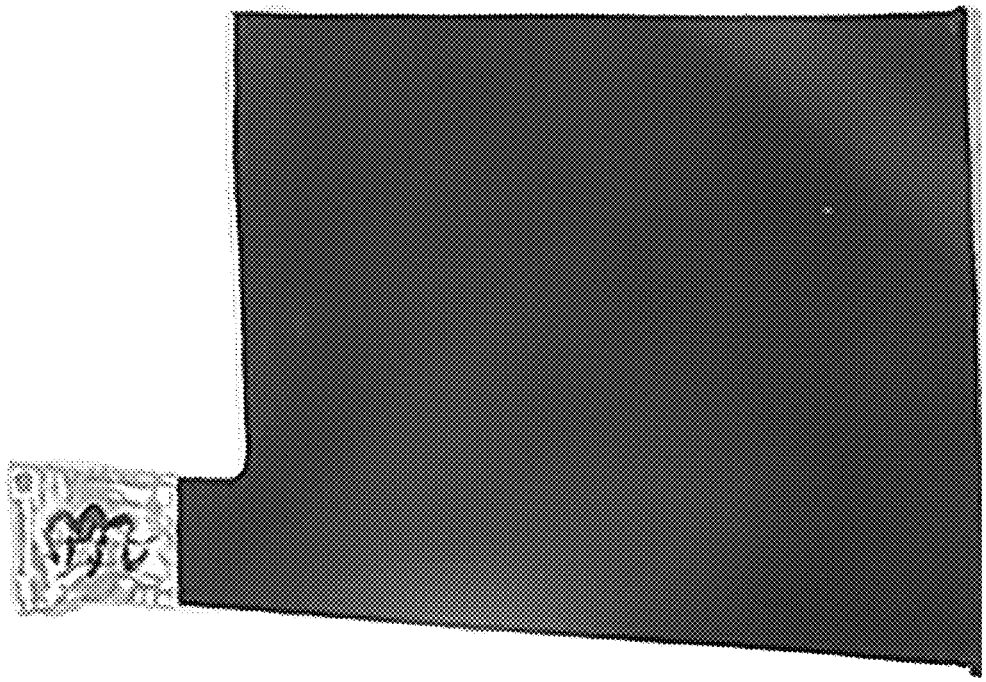

A TMCCC cathode material having a composition of $K_{0.63}Na_{0.0045}Mn_{0.72}Fe_{0.28}[Fe(CN)_6]_{0.81}(H_2O)_{2.49}$, and D10, D50, D90 of 4.9 um, 7.0 um and 9.2 um was mixed with an elastomeric adhesive binder and carbon black in an organic solvent blend to form a slurry. This slurry was deposited onto a carbon coated aluminum foil current collector using a drawdown coater and dried at 60° C. for 35 minutes to evaporate the solvent. Electrodes were punched out of the coat using a die punch. FIG. 7 illustrates a set of ensuing electrodes made with the TMCCC of example X lacking appreciable surface defects.

EXAMPLE XI

A TMCCC cathode material with a composition of $K_{1.18}Mn_{0.80}Fe_{0.20}[Fe(CN)_6]_{0.86}(H_2O)_{5.93}$ and D10, D50, D90 of 1.1 um, 3.6 um and 6.9 um was processed into an electrode similarly to the manner as in example X.

Figure 8:
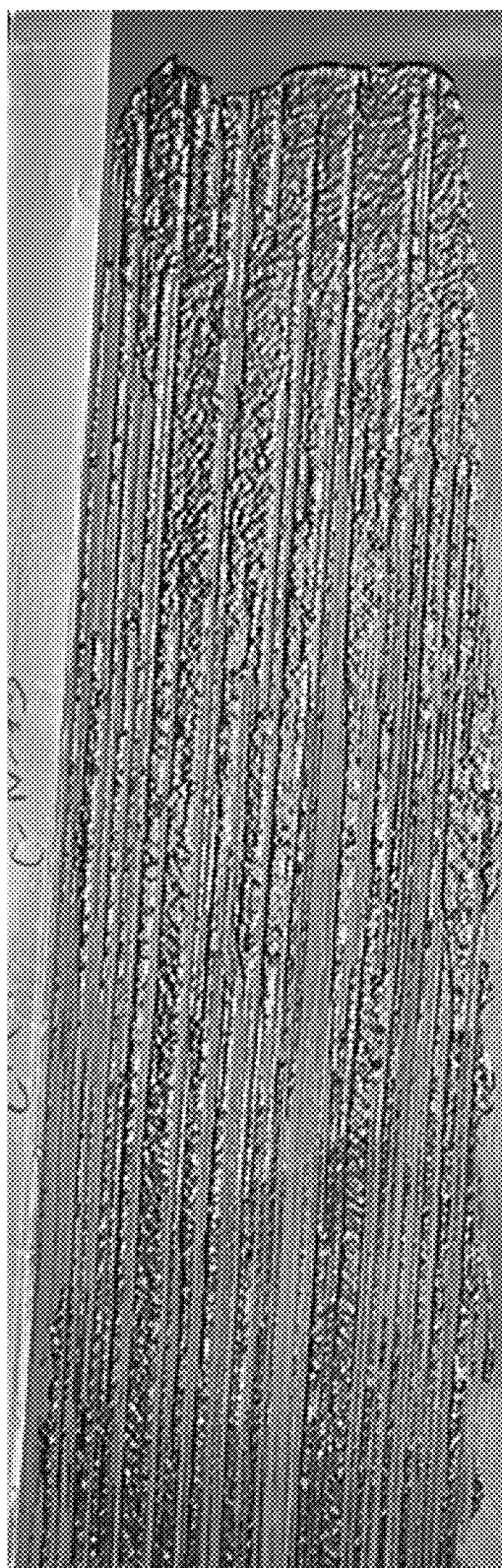
FIG. 8 illustrates a resulting coat made using the TMCCC of example XI.

FIG. 8 illustrates a resulting coat made using the TMCCC of example XI. Contrary to the electrodes seen in FIG. 7, FIG. 8 depicts severe aggregation on the resulting coat from example XI material. It is believed that the severe aggregation may result from the TMCCC having D10, D50, D90 outside the ranges specified herein as part of a preferred hierarchy. Such aggregation interferes with the TMCCC from being converted reliably to electrochemical cells.

The use of the TMCCC proposed is not limited by the choice of anode that is used when assembling the electrochemical cell. Possible anodes that can be paired with TMCCC electrodes include but are not limited to TMCCC electrodes such as Prussian Blue Analogs (PBA); Carbon Electrodes such as graphite, hard carbon or activated charcoal electrodes; Antimony based electrodes; Tin based electrodes; and Silicon based electrodes. The following examples give support for the TMCCC's ability to form functional electrochemical cells irrespective of the choice of Anode.

EXAMPLE XII

Figure 9:
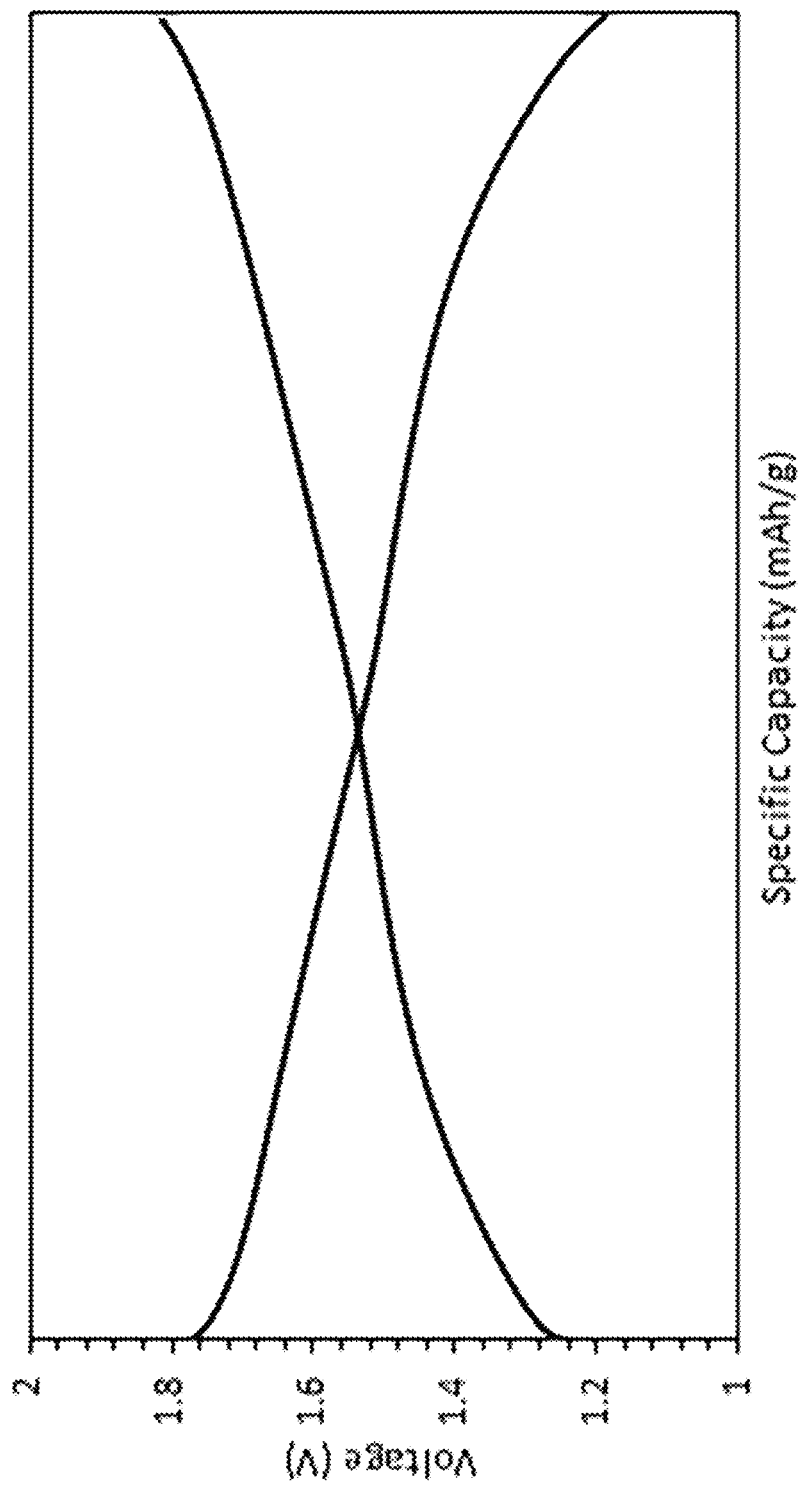
FIG. 9 illustrates a charge-discharge cycle of the electrochemical cell made in example XII, confirming that a functioning electrochemical cell can be made by pairing a TMCCC cathode electrodes with a PBA anode.

The TMCCC cathode material described in example I and the TMCCC described in example IX were mixed in a 76:24 ratio. This TMCCC blend was then mixed overnight with an elastomeric adhesive binder and nanoparticulate carbon black in an organic solvent blend to form a slurry. The ensuing slurry was then coated onto a carbon-coated Aluminum foil using a slot die coater and then passed through a series of chamber ovens. This coat was then calendered (roll pressed) to further increase its density, vacuum dried, and finally punched into electrodes using a matched metal press to form electrodes. The electrodes were then dried in a vacuum drier to remove moisture in the electrodes. A Honbro Z stacker then created electrochemical cells by weaving the dried TMCCC electrodes and PBA anode electrodes with a porous membrane separator. An electrolyte containing a Sodium(I) Bis(trifluoromethanesulfonyl)imide salt and an acetonitrile solvent were then added to the cells before they were sealed into laminate pouches. The completed cells underwent a full discharge at 1 C followed by a charge-discharge cycle at 1 C. FIG. 9 illustrates a 1 C charge-discharge cycle of the electrochemical cell made in example XII, confirming that a functioning electrochemical cell can be made by pairing a TMCCC cathode electrodes with a PBA anode.

EXAMPLE XIII

Figure 10:
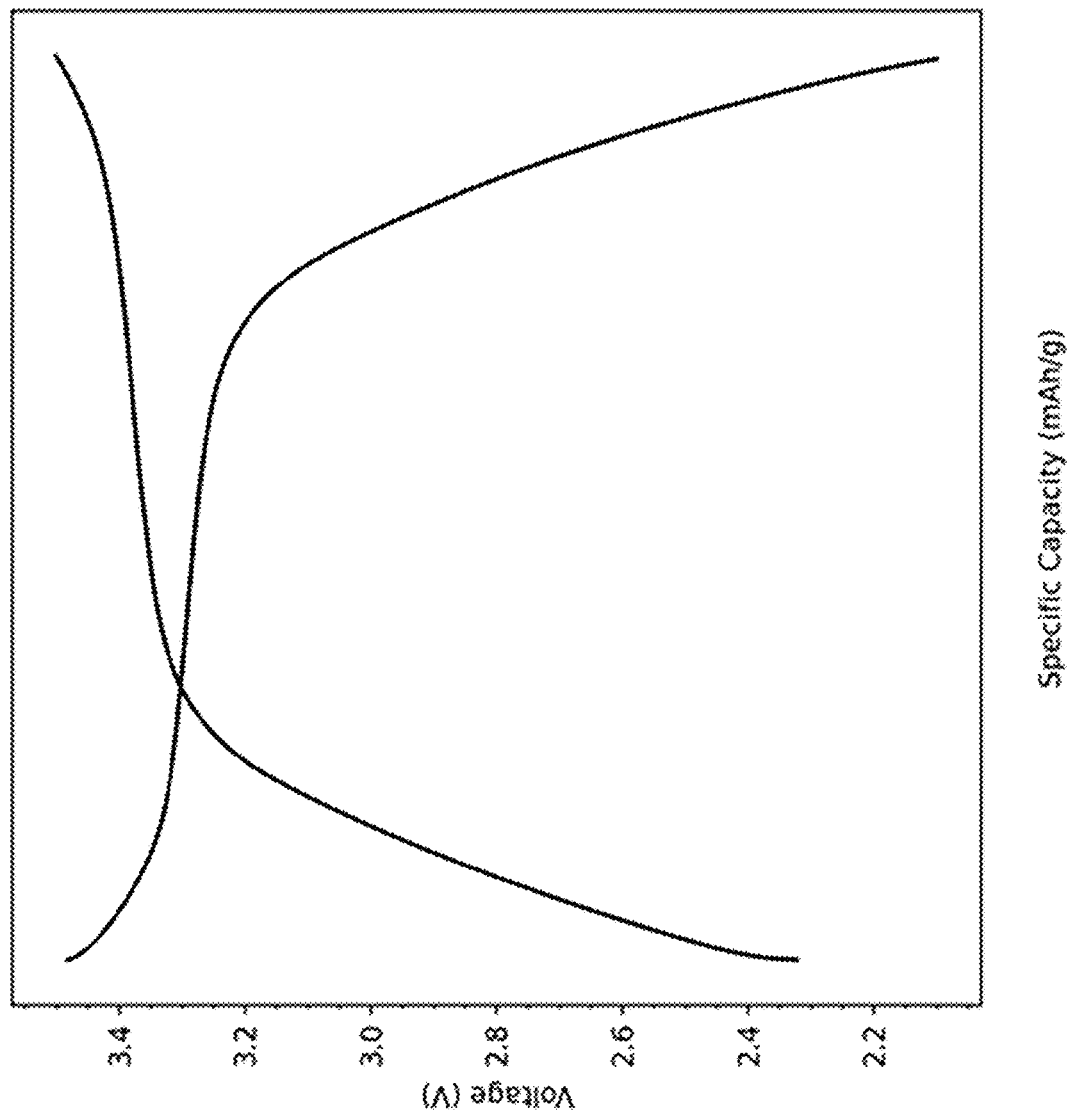
FIG. 10 illustrates a charge-discharge cycle of the electrochemical cell made in example XIII, confirming that a functioning electrochemical cell can be created by pairing a TMCCC cathode with a hard carbon anode.

A TMCCC cathode material similar to the one described in example I was mixed overnight with an elastomeric adhesive binder and nanoparticulate carbon black in an organic solvent blend to form a slurry. This slurry was deposited onto a carbon coated aluminum foil current collector using a frontier coater and dried at 80° C. for 35 minutes to evaporate the solvent. The ensuing coat was calendered (roll pressed) to further increase its density, vacuum dried, and cut into electrodes for use in electrochemical cells. The TMCCC electrodes were paired with hard carbon anode electrodes and then assembled into electrochemical cells containing a porous membrane separator, and an electrolyte containing a Sodium(I) Bis(trifluoromethanesulfonyl)imide salt and an acetonitrile solvent. The cells were massaged and left to soak overnight to enable impregnation of electrolyte through the pores before electrochemical testing. The cell then went through a charge-discharge cycle at a rate of C/10. The cells then underwent galvanostatic cycling at C/5. FIG. 10 illustrates the charge and discharge curves at C/5 for an Example XIII material and demonstrates that a functioning electrochemical cell can be created by pairing a TMCCC cathode with a hard carbon anode.

Figure 11:
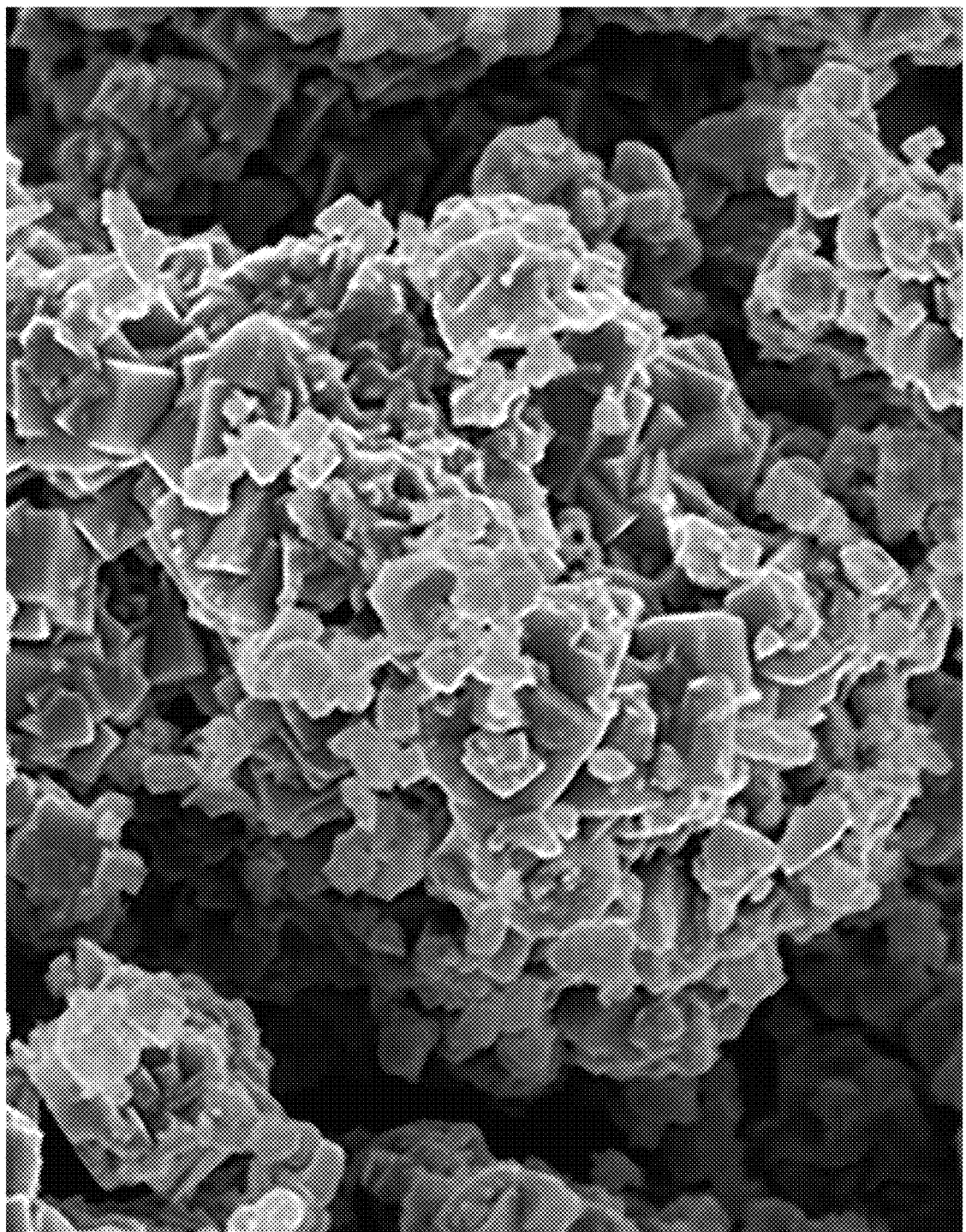
FIG. 11 illustrates a hierarchical structure of the disclosed TMCCC which contrasts with the nanoparticulate TMCCC described by REF[2]

REF[2] investigates a role of the particle size of a TMCCC containing cell on its electrochemical performance, however, the reference appears to have focused on monocrystalline particles of a single chemical composition of TMCCC, $KNi[Fe(CN)_6]$, in a limited range of particle sizes ranging from 0.038 um to 0.38 um. Embodiments of the present invention may pertain to TMCCC comprising polycrystalline particles in the range of 6-20 um. This discrepancy in size indicates a divergence in TMCCC technologies; while REF[2] and other art may address nanoparticulate TMCCC, some current embodiments of the present invention involve TMCCC with a hierarchical structure. In other words, the TMCCC presently discussed is made up of agglomerates of aggregates which in turn consist of the individual crystal. FIG. 11 illustrates a hierarchical structure using an SEM image of the disclosed hierarchical TMCCC which contrasts with the nanoparticulate TMCCC described by REF[2]. As used herein, the term "aggregate" is defined as an ellipsoidal cluster of interconnected TMCCC crystals. As used herein, the term "agglomerate" is defined as a cluster of aggregates that have fused or otherwise combined.

For presentation of embodiments of the present invention, the preceding discussion of particle hierarchy addresses many implementations. There is a nuance in that there may be multiple levels of hierarchy in particle structure. In a simple case, the primary crystallites are stuck together into a big particle that is quite dense (it may be that microscope images will not show any pores, and area measurements may detect just the surface area of the outside of the particle). There could also be a case in which the primary crystallites are very densely stuck together into somewhat larger dense "sub-particles", which in turn are more loosely connected together into an even larger particle. In this case, imaging may visualize pores between the sub-particles. Such particle hierarchy distributions and implementations are within the scope of the present invention.

Figure 12:
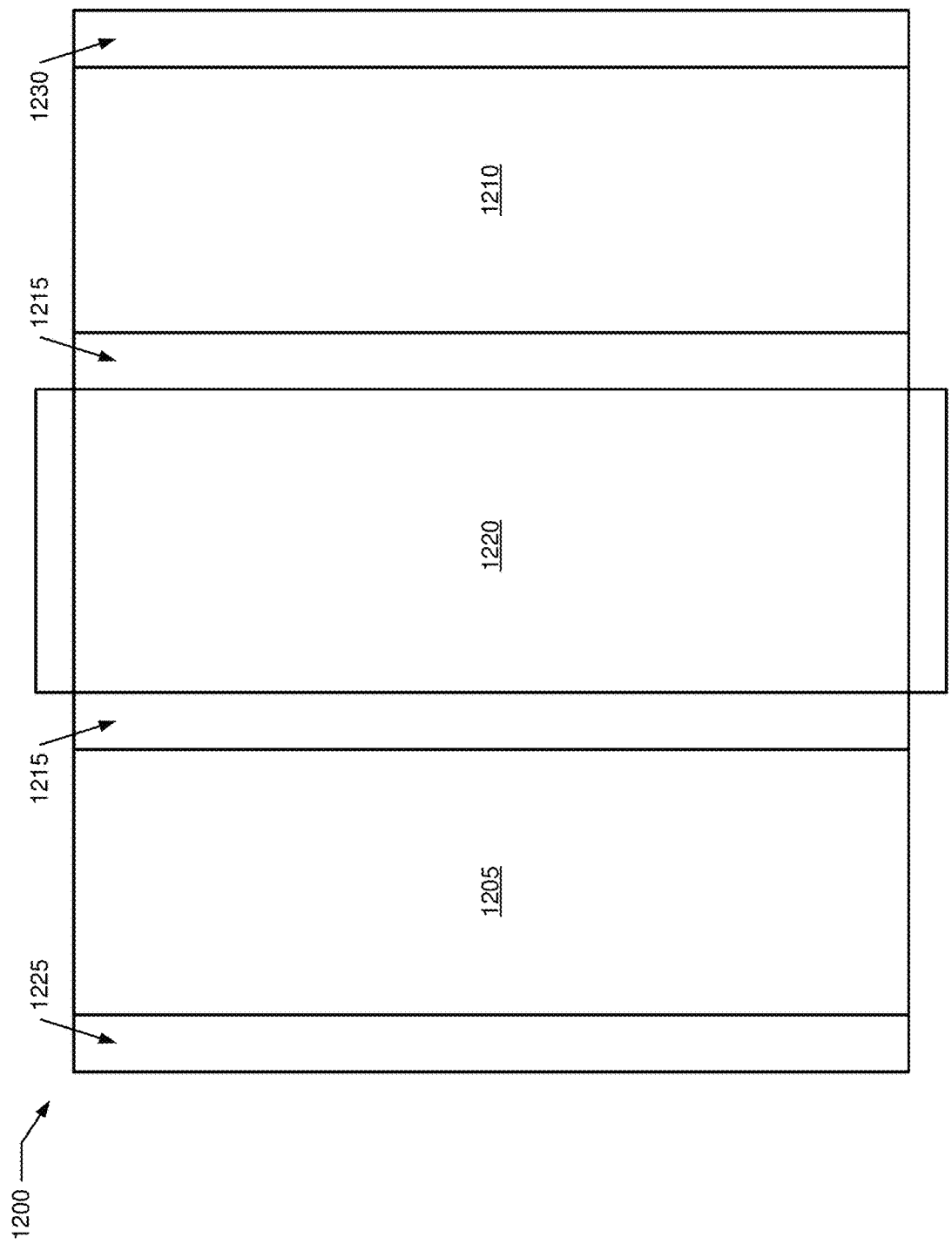
FIG. 12 illustrates a generic electrochemical cell.

FIG. 12 illustrates a generic electrochemical cell 1200. Cell 1200 includes a first electrode 1205 (e.g., a cathode electrode), a second electrode 1210 (e.g., an anode electrode), a liquid electrolyte 1215, a separator 1220, a first current collector 1225, and a second current collector 1230. One or both electrodes include a coordination compound, and more specifically a transition metal cyanide coordination compound.

REFERENCES

The following references are cited herein, and each of which is hereby expressly incorporated by reference thereto in its entirety for all purposes:
REF[1]—U.S. Pat. No. 9,608,268—Alkali and alkaline-earth ion batteries with non-metal anode and hexacyno-metallate cathode;
REF[2]—Li et al., Li-ion and Na-ion insertion into size-controlled nickel hexacynoferrate nanoparticles, RSC Advances, 2014, 4, 24955-24961.

The system and methods above have been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention is not limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A method manufacturing an electrically conductive structure for an electrochemical cell, comprising the steps of:
    a) providing an electrochemically active material including an agglomerated TMCCC;
    b) providing a conductive material; and
    c) binding said electrochemically active material to said conductive material producing a hierarchical structure, and wherein said hierarchical structure includes a plurality of primary crystallites having a size D1, and in which said plurality of primary crystallites are agglomerated into a set of agglomerates each agglomerate having a size D2>D1;

wherein said agglomerated TMCCC includes:
a composition of
$L_x M_y N_z$
$Ti_{a1} V_{a2} Cr_{a3} Mn_{a4} Fe_{a5} CO_{a6} Ni_{a7} Cu_{a8} Zn_{a9} Ca_{a10} Mg_{a11}$
$[R(CN)_6]_b (H_2O)_c$; and
a plurality of particles of said composition; and
wherein said plurality of particles include a hierarchical structure, and wherein said hierarchical structure includes a plurality of primary crystallites having a size D1, and in which said plurality of primary crystallites are agglomerated into a set of agglomerates each agglomerate having a size D2>D1;

wherein each of L, M and N represents an alkaline metal;
wherein each of P, Q, and R represents a metal cation optionally including one or more of Ti, V, Cr, Mn, Fe, Co, Ni, Cu, Zn, Ca, Mg, and the like;
wherein $0 \leq x \leq 2$;
wherein $0 \leq y \leq x$;
wherein $0 \leq z \leq x$;
wherein $0 < b \leq 1$;
wherein $0 < c$;
wherein for each element of the set {a1, a2, a3, a4, a5, a6, a7, a8, a9, a10, a11}, $0 \leq \{a1, a2, a3, a4, a5, a6, a7, a8, a9, a10, a11\} \leq 1$; and
wherein at least one of {a1, a2, a3, a4, a5, a6, a7, a8, a9, a10, a11} is >0.

2. The method of claim 1 wherein wherein D1<1 µm.

3. The method of claim 2 wherein D2 includes a particle size distribution having a $50^{th}$ percentile size>6 µm.

4. The method of claim 3 wherein said particle size distribution D2 includes a $10^{th}$ percentile size greater than 1.5 µm.

5. The method of claim 4 wherein said particle size distribution D2 includes a $90^{th}$ percentile size greater than 7.5 µm.

6. The method of claim 1 wherein said composition includes a specific surface area>2 m² per gram.

7. The method of claim 5 wherein said composition includes a specific surface area>2 m² per gram.

8. The method of claim 1 wherein said composition includes a tap density<0.9 g/cm³.

9. The method of claim 5 wherein said composition includes a tap density<0.9 g/cm³.

10. The method of claim 7 wherein said composition includes a tap density<0.9 g/cm³.

* * * * *